United States Patent
Baba

(10) Patent No.: US 9,227,485 B2
(45) Date of Patent: Jan. 5, 2016

(54) MECHANISM FOR RAISING AND LOWERING WINDOWPANE

(71) Applicant: SHIROKI CORPORATION, Kanagawa (JP)

(72) Inventor: Masanao Baba, Kanagawa (JP)

(73) Assignee: SHIROKI CORPORATION, Kanagawa (JP)

( * ) Notice: Subject to any disclaimer, the term of this patent is extended or adjusted under 35 U.S.C. 154(b) by 0 days.

(21) Appl. No.: 14/403,232

(22) PCT Filed: Apr. 15, 2013

(86) PCT No.: PCT/JP2013/061159
§ 371 (c)(1),
(2) Date: Nov. 24, 2014

(87) PCT Pub. No.: WO2013/175895
PCT Pub. Date: Nov. 28, 2013

(65) Prior Publication Data
US 2015/0101252 A1    Apr. 16, 2015

(30) Foreign Application Priority Data
May 24, 2012    (JP) ................................. 2012-118559

(51) Int. Cl.
*B60J 1/17*    (2006.01)
*E05F 11/38*    (2006.01)
(Continued)

(52) U.S. Cl.
CPC ............... *B60J 1/17* (2013.01); *E05D 15/0621* (2013.01); *E05F 11/382* (2013.01);
(Continued)

(58) Field of Classification Search
CPC ......... B60J 1/17; E05F 11/483; E05F 15/689; E05F 11/488; E05F 11/382; E05F 11/486; Y10T 403/7039; Y10T 403/7098; E05D 15/0621
See application file for complete search history.

(56) References Cited

U.S. PATENT DOCUMENTS

| 4,321,771 A | 3/1982 | Koike et al. |
| 2003/0026941 A1* | 2/2003 | Togawa et al. .................. 428/99 |

(Continued)

FOREIGN PATENT DOCUMENTS

| DE | 10 2009 052 761 | * | 6/2010 |
| FR | 2 890 604 | * | 3/2007 |

(Continued)

OTHER PUBLICATIONS

International Search Report PCT/JP2013/061159 dated Jul. 16, 2013.

(Continued)

*Primary Examiner* — Gregory Strimbu
(74) *Attorney, Agent, or Firm* — Millen, White, Zelano & Branigan, P.C.

(57) ABSTRACT

A mechanism for raising and lowering a windowpane achieves a satisfactory mounting of a guide rail to a drum housing to allow visual checking of the mounted state of the guide rail to the drum housing. Relative movement between the guide rail and the drum housing is restricted in the vehicle widthwise direction after completion of the mounting. An engaging projection formed at the end of the drum housing projects toward the guide rail. An engaging portion of the guide rail restricts relative movement between the guide rail and the drum housing in the vehicle widthwise direction by being engaged with the engaging projection.

7 Claims, 7 Drawing Sheets

(51) Int. Cl.
  *E05F 11/48* (2006.01)
  *E05F 15/689* (2015.01)
  *E05D 15/06* (2006.01)
(52) U.S. Cl.
  CPC ............ *E05F 11/483* (2013.01); *E05F 11/486* (2013.01); *E05F 15/689* (2013.01); *E05Y 2201/684* (2013.01); *E05Y 2900/55* (2013.01)

(56) References Cited

U.S. PATENT DOCUMENTS

| | | | |
|---|---|---|---|
| 2003/0140562 A1* | 7/2003 | Staser et al. | 49/352 |
| 2007/0084130 A1* | 4/2007 | Gaustad et al. | 49/502 |
| 2008/0005971 A1* | 1/2008 | Dickie et al. | 49/349 |
| 2011/0068609 A1* | 3/2011 | Saito et al. | 296/201 |
| 2013/0205669 A1* | 8/2013 | Nakamura et al. | 49/349 |

FOREIGN PATENT DOCUMENTS

| | | |
|---|---|---|
| JP | 563775 A | 1/1981 |
| JP | 2006028973 | 2/2006 |
| JP | 200913666 A | 1/2009 |
| JP | 4637522 B2 | 2/2011 |
| WO | WO 2010/135445 * | 11/2010 |

OTHER PUBLICATIONS

English Abstract of JP2006028973, Publication Date: Feb. 2, 2006.
English Abstract of JP-2009013666, Publication Date: Jan. 1, 2009.

* cited by examiner

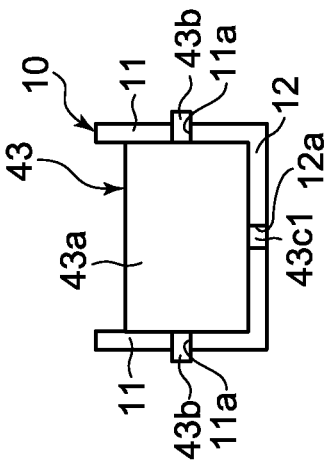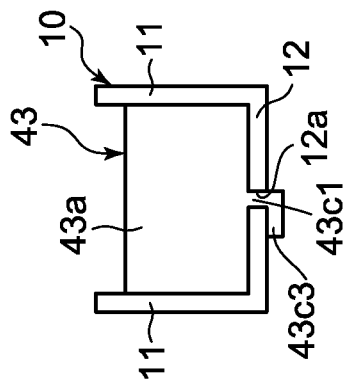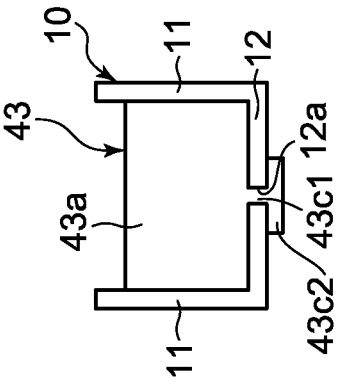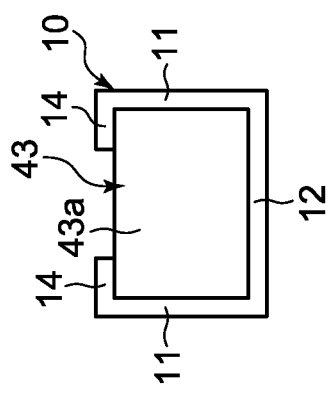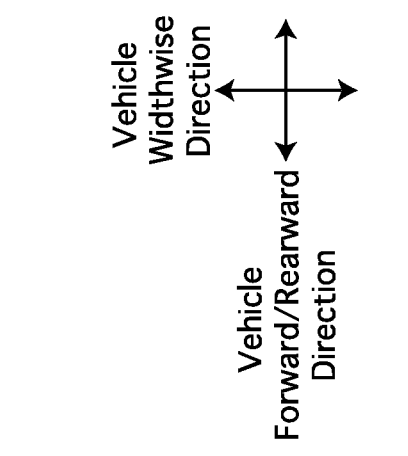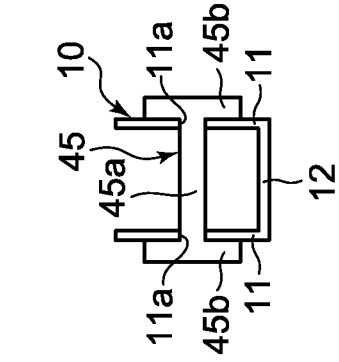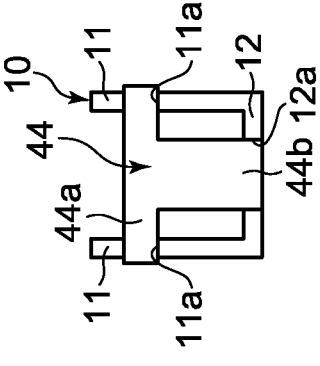

MECHANISM FOR RAISING AND LOWERING WINDOWPANE

TECHNICAL FIELD

The present invention relates to a mechanism for raising and lowering a windowpane.

BACKGROUND ART

For instance, a mechanism for raising and lowering a windowpane of a motor vehicle has a structure such that a slider base fixed to the windowpane is supported to be movable up and down on a guide rail, fixed to a structural member of a door, and that a drive wire(s) extended from the slider base in the vertical direction is wound around a wire guide member and a wind-up drum, respectively provided at the upper and lower ends of the guide rail. A motor unit is connected to the wind-up drum, and driving the wind-up drum forward and reverse by the motor unit causes the slider base, together with the windowpane, to move up and down on the guide rail.

The motor unit and the wind-up drum are supported by a drum housing, and the guide rail is mounted and fixed to this drum housing. Japanese Patent Publication No. 4,637,522 describes forming the guide rail so that it includes a flat portion and a raised portion by bending the guide rail to have a predetermined cross sectional shape and forming a fitting groove on the drum housing in which the flat portion and the raised portion are fitted as a technique to mount the guide rail to the drum housing.

However, according to the technique described above, there is a possibility of a fitting failure of the guide rail to the drum housing occurring because the mounted state of the guide rail to the drum housing (the fitting state of the guide rail to the fitting groove) cannot be visually checked.

To visually check the mounted state of the guide rail to the drum housing (the fitting state of the guide rail to the fitting groove) in, e.g., the technique described above, a special solution such as providing the drum housing with an inspection hole is essential, and it is inevitable that the structure of the drum housing becomes complicated and that the cost becomes high. In addition, formation of the inspection hole in the drum housing deteriorates the strength of the fitting portion of the drum housing into the guide rail, so that the drum housing is easily damaged. Additionally, when the guide rail is mounted to the drum housing, how the relative movement between the guide rail and the drum housing is restricted in the vehicle widthwise direction is an important technical problem.

SUMMARY OF THE INVENTION

The present invention has been accomplished in view of the problems described above, and an object of the present invention is to obtain a mechanism for raising and lowering a windowpane, wherein the mechanism makes it possible to achieve a satisfactory mounting of a guide rail to a drum housing by visually checking the mounted state of the guide rail to the drum housing without needing a special solution such as providing the drum housing with an inspection hole, and makes it possible to securely restrict relative movement between the guide rail and the drum housing in the vehicle widthwise direction after completion of the mounting of the guide rail to the drum housing.

The windowpane raising and lowering mechanism of the present invention includes a guide rail which guides a slider base, to which a windowpane is fixed, in a manner to allow the slider base to be slidable therealong; a wire guide member which is provided at one end of the guide rail; a drum housing which is provided at the other end of the guide rail and supports a wind-up drum, which is driven to rotate by a drive portion; and a drive wire which extends from the slider base and is wound around the wire guide member and the wind-up drum. An engaging projection which projects toward the guide rail is formed at an end of the drum housing on the guide rail side. An engaging portion, which restricts relative movement between the guide rail and the drum housing in a vehicle widthwise direction by being engaged with the engaging projection from outside to be fixed to the drum housing, is formed at an end of the guide rail on the drum housing side.

The engaging projection of the drum housing can include a columnar portion and a protrusion which projects from the columnar portion. The engaging portion of the guide rail comprises a box section including a pair of facing walls and a connecting wall which connects the pair of facing walls; and a slit which is formed in at least one of the pair of facing walls and the connecting wall, an end of the slit being open. The relative movement between the guide rail and the drum housing in the vehicle widthwise direction is restricted by the columnar portion being surrounded by the box section and by the protrusion being fit into the slit.

The slit can be formed in the connecting wall, wherein a retaining wall portion which extends alongside an outer surface of the connecting wall is formed at an end of the protrusion that is fitted into the slit of the connecting wall. The relative movement between the guide rail and the drum housing in the vehicle widthwise direction is restricted by the connecting wall being sandwiched from the inside and outside thereof between the columnar portion and the retaining wall portion.

The slit can be formed in at least one of the pair of facing walls, and the relative movement between the guide rail and the drum housing in the vehicle widthwise direction is restricted by the protrusion being fitted into the slit of the facing walls.

The slit can be formed in at least one of the pair of facing walls, wherein a retaining wall portion is formed at an end of the protrusion that is fitted into the slit of the facing walls. The relative movement between the guide rail and the drum housing in the vehicle forward/rearward direction is restricted by the facing walls being sandwiched from the inside and outside thereof between the columnar portion and the retaining wall portion.

The slit can be formed in the connecting wall, and the relative movement between the guide rail and the drum housing in the vehicle forward/rearward direction is restricted by fitting the protrusion into the slit of the connecting wall.

The drum housing can be made of synthetic resin and comprises a housing portion which houses the wind-up drum. The drum housing is molded using a split mold including a fixed mold and a movable mold which move toward and away from each other in a direction orthogonal to a projecting direction of the engaging projection and in a direction in which the wind-up drum is housed in the housing portion.

According to the invention, since the engaging projection that projects toward the guide rail is formed at the end of the drum housing on the guide rail side and the engaging portion that is engaged with the engaging projection from outside to be fixed to the drum housing is formed at the end of the guide rail on the drum housing side, it is possible to achieve a satisfactory mounting of a guide rail to a drum housing by visually checking the mounted state of the guide rail to the drum housing without needing a special solution such as providing the drum housing with an inspection hole, and it is possible to securely restrict relative movement between the guide rail and the drum housing in the vehicle widthwise direction after completion of the mounting of the guide rail to the drum housing.

According to the invention, since the guide rail is mounted to the drum housing by engagement of the columnar portion of the drum housing with the box section of the guide rail and engagement of the protrusion of the drum housing with the slit of the guide rail, relative movement between the guide rail and the drum housing in the vehicle widthwise direction can be more securely restricted. In addition, the engaged state between the protrusion of the drum housing and the slit of the guide rail becomes obvious at a glance if the side of the guide rail is viewed, which makes the mounted state of the guide rail to the drum housing even more easier to check.

According to the invention, it is possible to more reliably restrict relative movement between the guide rail and the drum housing in the vehicle widthwise direction after completion of the mounting of the guide rail to the drum housing.

According to the invention, after completion of the mounting of the guide rail to the drum housing, it is possible to restrict also relative movement between the guide rail and the drum housing in the vehicle forward/rearward direction in addition to relative movement between the guide rail and the drum housing in the vehicle widthwise direction.

According to the invention, the drum housing can be molded using a low-priced split mold. In this connection, in Japanese Patent Publication No. 4,637,522 mentioned above, an expensive slide mold is indispensable in order to mold the drum housing since fitting grooves are formed on the drum housing.

BRIEF DESCRIPTION OF DRAWINGS

FIGS. 8A-G show first drawings of other embodiments (modified embodiments) of the engaging projection that is formed on the drum housing and the engaging portion that is formed on the guide rail.

DESCRIPTION OF EMBODIMENTS

Figure 1:
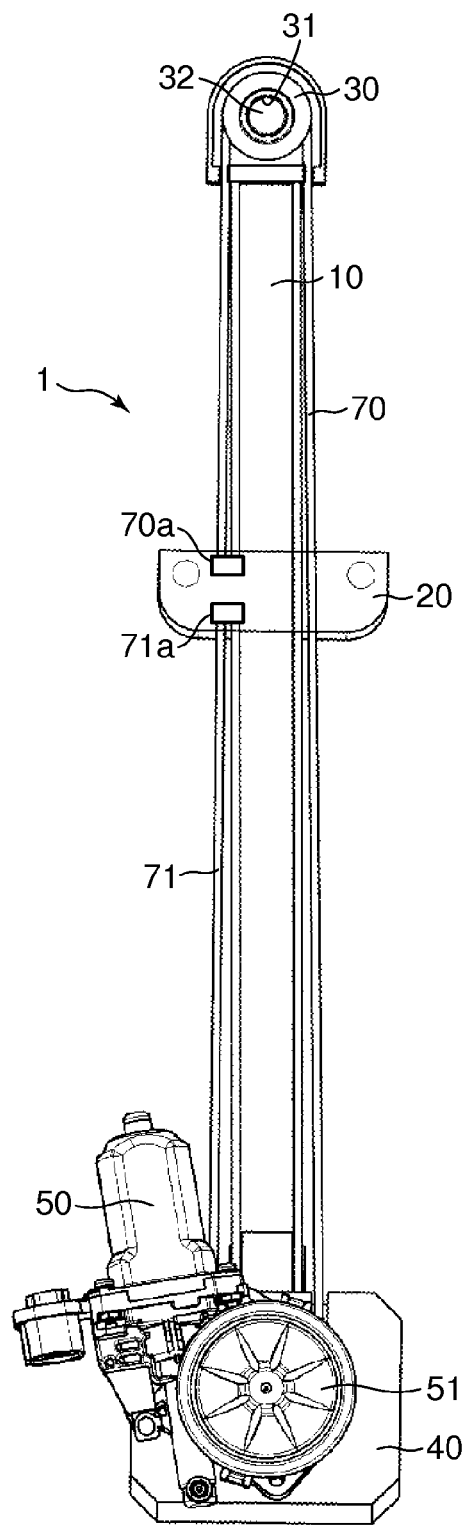
FIG. 1 is a diagram showing the structure of a mechanism for raising and lowering a windowpane according to the present invention.
Figure 2:
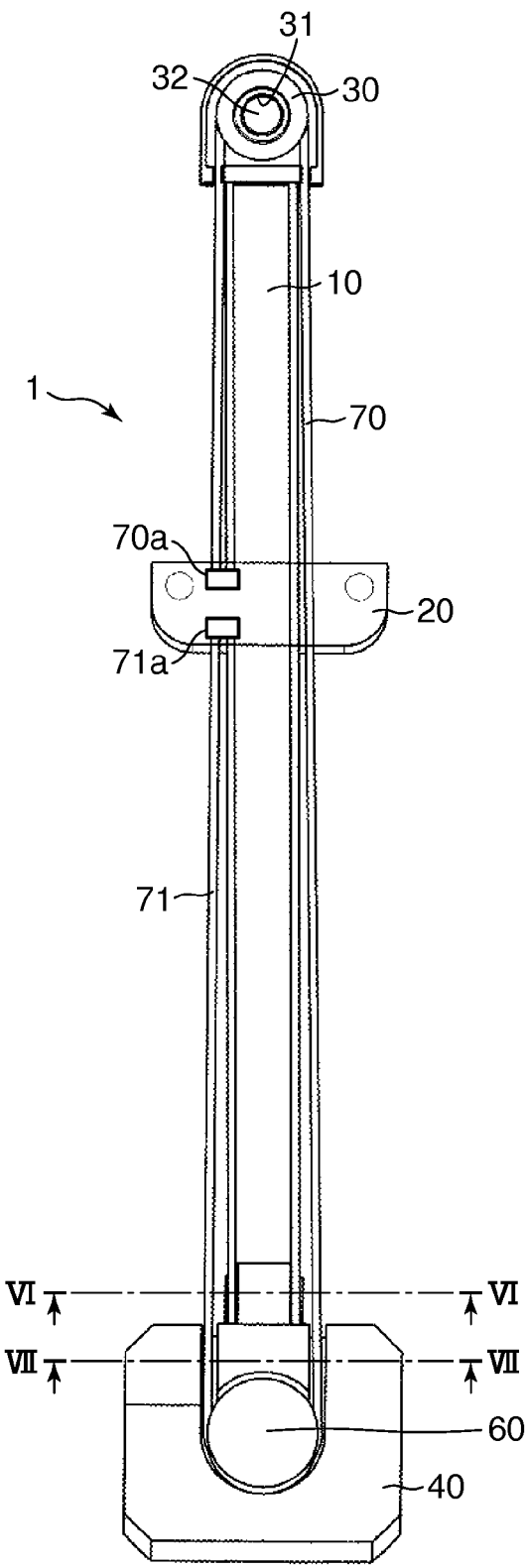
FIG. 2 is a diagram showing the windowpane raising and lowering mechanism shown in FIG. 1 with a motor unit and a part of a wind-up drum omitted.

FIGS. 1 and 2 show the structure of a windowpane raising and lowering mechanism 1 according to the present invention. In a state where a motor vehicle is equipped with the windowpane raising and lowering mechanism 1, the leftward/rightward direction in FIG. 1 or 2 corresponds to the vehicle forward/rearward direction, and the direction perpendicular to the sheet of FIG. 1 or 2 corresponds to the vehicle widthwise direction. The windowpane raising and lowering mechanism 1 is provided with a guide rail 10 which is fixed to a structural member (not shown) in a door and extends in the vertical direction, and a slider base 20 which is supported by the guide rail 10 to be freely movable up and down along the guide rail 10. A windowpane (not shown) is fixed to the slider base 20. A wire guide pulley (wire guide member) 30 is installed on the upper end of the guide rail 10 to be rotatable on a rotational shaft 32 that is inserted into a rotational shaft hole 31 of the wire guide pulley 30. A drum housing 40 is fixed to the lower end of the guide rail 10. The drum housing 40 is provided with a motor unit (drive unit) 50 and a wind-up drum 60 which is driven to rotate by the motor unit 50. The motor unit 50 is shown in FIG. 1 and the wind-up drum 60 is hidden by a worm wheel 51 (which transmits a rotational driving force of the motor unit 50 to the wind-up drum 60) in FIG. 1. In FIG. 2, the motor unit 50 and the worm wheel 51 are not shown and the wind-up drum 60 is shown. One end of each of two drive wires 70 and 71 are wound onto the wind-up drum 60 and fixed thereto. The other end of the drive wire 70 which extends from the wind-up drum 60 is fixed to the slider base 20 at a fixing portion 70a via the wire guide pulley 30, while the other end of the drive wire 71 which extends from the wind-up drum 60 is fixed directly to the slider base 20 at a fixing portion 71a. According to the structure described above, driving the wind-up drum 60 forward and reverse by the motor unit 50 causes the slider base 20, together with the windowpane not shown in the drawings, to move up and down on the guide rail 10.

Figure 3:
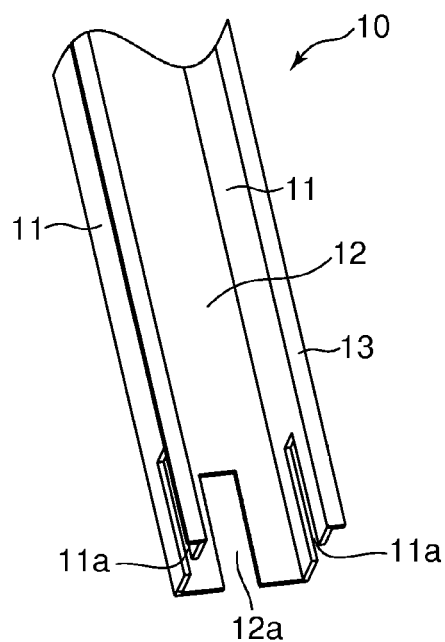
FIG. 3 is a perspective view showing the structure of a guide rail according to the present invention.
Figure 4:
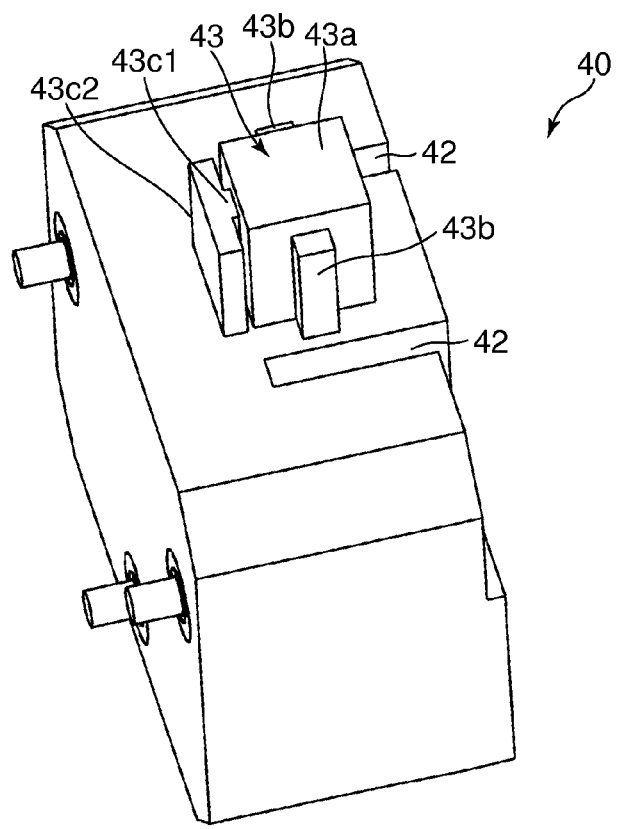
FIG. 4 is a perspective view showing the structure of a drum housing according to the present invention.
Figure 5:
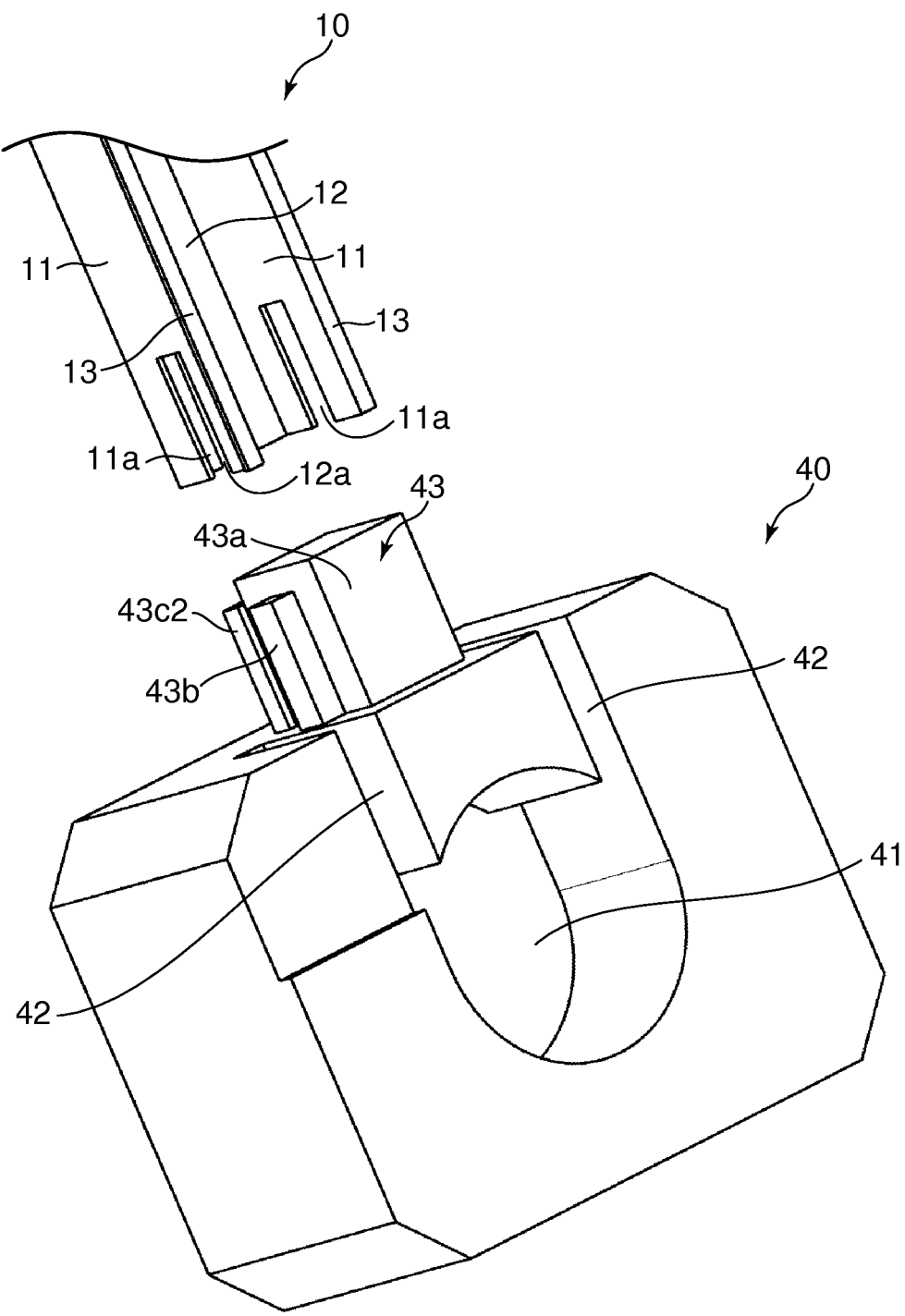
FIG. 5 is a perspective view showing a state before the guide rail is mounted to the drum housing.
Figure 6:
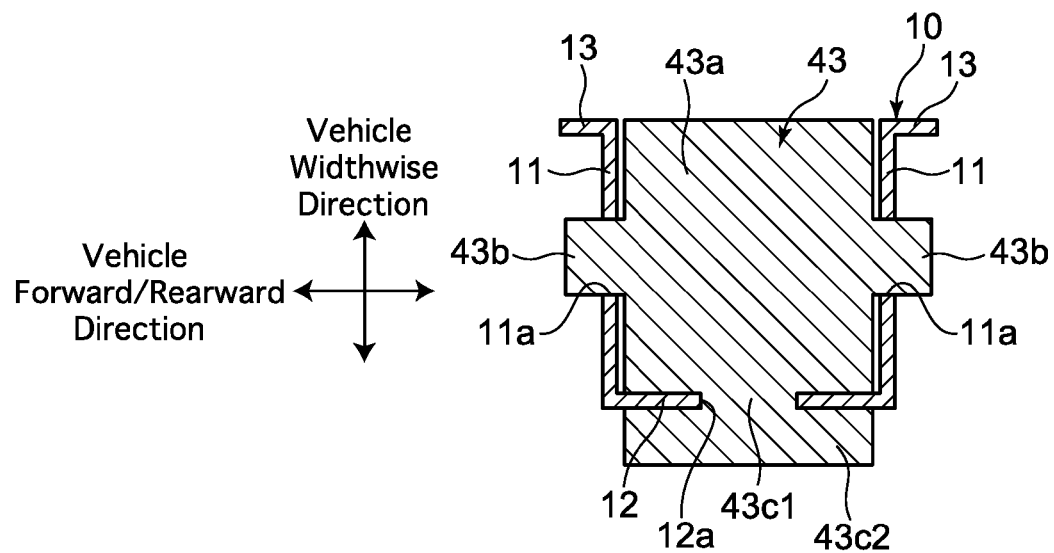
FIG. 6 is a cross sectional view taken along the line VI-VI shown in FIG. 2.
Figure 7:
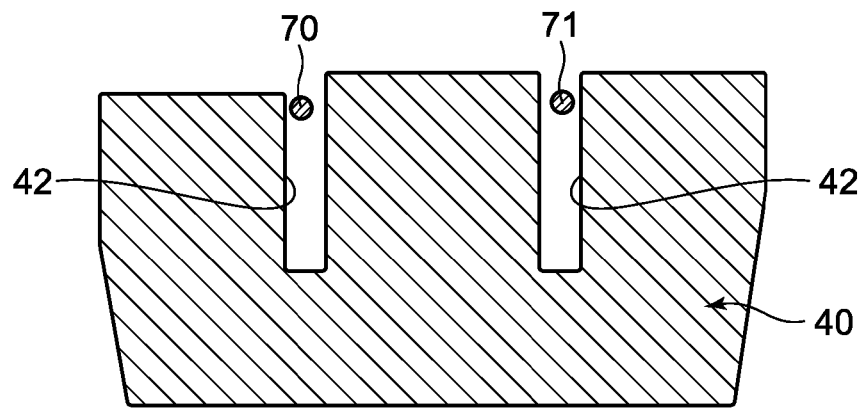
FIG. 7 is a cross sectional view taken along the line VII-VII shown in FIG. 2.

The structure of the guide rail 10 will be hereinafter discussed with reference to FIGS. 3, 5 and 6. The guide rail 10 is a uniform cross-sectional member configured of a substantially cross-sectional U-shaped box section (engaging portion) provided with a pair of facing walls 11, a connecting wall 12 which connects one end of each of the pair of facing walls 11, and outward-projecting lugs (outward flange portions) 13 which project outward in a plane parallel to the connecting wall 12 from the other end of each of the pair of facing walls 11. The pair of facing walls 11 and the connecting wall 12 are provided with slits (engaging portions) 11a and a slit (engaging portion) 12a, respectively, the ends of which are open toward the drum housing 40. Both the slits 11a and the slit 12a extend in a direction parallel to the lengthwise direction of the guide rail 10.

The structure of the drum housing 40 will be hereinafter discussed with reference to FIGS. 4 through 7. The drum housing 40 is a integrally molded product made of synthetic resin. The drum housing 40 is provided at a center thereof with a circular hole (housing portion) 41 which houses the wind-up drum 60, and the drum housing 40 is provided, at the end thereof on the guide rail 10 side, with two wire guide grooves 42 which are communicatively connected with the circular hole 41 to guide the drive wires 70 and 71. The drum housing 40 is further provided, at the end thereof on the guide rail 10 side, with an engaging projection 43 which projects toward the guide rail 10. The engaging projection 43 is provided with a columnar portion 43a, in the shape of a rectangle in a plan view, which is press-fitted lightly into and surrounded by the box section of the guide rail 10, which is configured of the pair of facing walls 11 and the connecting wall 12. Protrusions 43b, which are fitted into the slits 11a with minimum clearance, are formed on the two sides of the columnar portion 43a which face the pair of facing walls 11. A protrusion 43c1 which is fitted into the slit 12a with minimum clearance is formed on the side of the columnar portion 43a which faces the connecting wall 12, and the protrusion 43c1 is provided at the end thereof with a retaining wall portion 43c2 which extends alongside an outer surface of the connecting wall 12 of the guide rail 10; the protrusion 43c1 and the retaining wall portion 43c2 form the shape of a letter T (an inverted letter T).

In the windowpane raising and lowering mechanism 1 that is constructed in the above described manner, when the guide rail 10 is mounted to the drum housing 40, the lower end of the guide rail 10 and the engaging projection 43 of the drum housing 40 are aligned so that the columnar portion 43a of the engaging projection 43 is surrounded by the box section of the guide rail 10, which is configured of the pair of facing walls 11 and the connecting wall 12, so that the protrusions 43b, which are formed on the columnar portion 43a to project therefrom, are fitted into the slits 11a of the pair of facing walls 11, so that the protrusion 43c1, which is formed on the columnar portion 43a to project therefrom, is fitted into the slit 12a of the connecting wall 12, and so that the retaining wall portion 43c2 that is formed at the end of the protrusion 43c1 extends alongside an outer surface of the connecting wall 12. Subsequently, in this aligned state, the lower end of the guide rail 10 and the engaging projection 43 of the drum housing 40 are brought into engagement with each other (see FIG. 6).

After the guide rail 10 and the drum housing 40 are mounted to each other, the columnar portion 43a of the engaging projection 43 is lightly press-fitted into the box section of the guide rail 10, and the guide rail 10 and the drum housing 40 are pressed against each other by the tensile force of the drive wire 70. Therefore, even if the guide rail 10 and the drum housing 40 are not cemented to each other, there is no possibility of a malfunction in which the guide rail 10 and the drum housing 40 are disengaged from each other occurring when the windowpane raising and lowering mechanism 1 is in use. In addition, the formation of the outward-projecting lugs 13 on the guide rail 10 makes it possible to improve the stability of the mounting of the guide rail 10 to the drum housing 40.

Furthermore, since the protrusions 43b are fitted into the slits 11a of the pair of facing walls 11 and since the protrusion 43c1 is fitted into the slit 12a of the connecting wall 12 so that the connecting wall 12 is sandwiched from the inside and outside thereof between the columnar portion 43a and the retaining wall portion 43c2, relative movement between the guide rail 10 and the drum housing 40 in the vehicle widthwise direction and the vehicle forward/rearward direction can be securely restricted.

In this manner, simply by aligning the lower end of the guide rail 10 and the engaging projection 43 of the drum housing 40 with each other and engaging the lower end of the guide rail 10 with the engaging projection 43 of the drum housing 40 with each other, the guide rail 10 can be easily and securely mounted to the drum housing 40, with stability, with relative movement between the guide rail 10 and the drum housing 40 in the vehicle widthwise direction and the vehicle forward/rearward direction being restricted. Moreover, the guide rail 10 can be favorably mounted to the drum housing 40 by visually checking the mounted state of the guide rail 10 to the drum housing 40 without needing a special solution, such as providing the drum housing 40 with an inspection hole.

FIG. 8(A) through 8(G) show other embodiments (modified embodiments) of the windowpane raising and lowering mechanism 1 according to the present invention, and more specifically, show other embodiments (modified embodiments) of the engaging projection that is formed on the drum housing 50 and the engaging portion that is formed on the guide rail 10.

In FIG. 8(A), the guide rail 10 is a uniform cross-sectional member which is configured of a cross-sectional U-shaped box section (engaging portion) provided with a pair of facing walls 11, a connecting wall 12 which connects one end of each of the pair of facing walls 11, and inward-projecting lugs (inward flange portions/engaging portions) 14 which project inward in a plane parallel to the connecting wall 12 from the other end of each of the pair of facing walls 11. No slits are formed in either the pair of facing walls 11 or the connecting wall 12.

The drum housing 40 is provided, at the end thereof on the guide rail 10 side, with an engaging projection 43 which projects toward the guide rail 10. The engaging projection 43 is configured of a columnar portion 43a, having the shape of a rectangle in a plan view, which is press-fitted lightly into and surrounded by the box section of the guide rail 10, which is configured of the pair of facing walls 11, the connecting wall 12 and the inward-projecting lugs 14. No projecting portions are formed on the columnar portion 43a.

In FIG. 8(B), the guide rail 10 is a uniform cross-sectional member which is composed of a cross-sectional U-shaped box section (engaging portion) provided with a pair of facing walls 11 and a connecting wall 12 which connects one end of each of the pair of facing walls 11. The connecting wall 12 is provided with a slit (engaging portion) 12a, the end of which is open toward the drum housing 40. The slit 12a extends in a direction parallel to the lengthwise direction of the guide rail 10.

The drum housing 40 is provided, at the end thereof on the guide rail 10 side, with an engaging projection 43 which projects toward the guide rail 10. The engaging projection 43 is configured of a columnar portion 43a, having the shape of a rectangle in a plan view, which is press-fitted lightly into and surrounded by the box section of the guide rail 10, which is configured of the pair of facing walls 11 and the connecting wall 12. A protrusion 43c1 which is fitted into the slit 12a with minimum clearance is formed on the side of the columnar portion 43a which faces the connecting wall 12, and the protrusion 43c1 is provided at the end thereof with a retaining wall portion 43c2 which extends alongside an outer surface of the connecting wall 12 of the guide rail 10, and additionally, the protrusion 43c1 and the retaining wall portion 43c2 form the shape of a letter T (an inverted letter T).

In FIG. 8(C), the guide rail 10 is a uniform cross-sectional member which is configured of a cross-sectional U-shaped box section (engaging portion) provided with a pair of facing walls 11 and a connecting wall 12 which connects one end of each of the pair of facing walls 11. The connecting wall 12 is provided with a slit (engaging portion) 12a, the end of which is open toward the drum housing 40. The slit 12a extends in a direction parallel to the lengthwise direction of the guide rail 10.

The drum housing 40 is provided, at the end thereof on the guide rail 10 side, with an engaging projection 43 which projects toward the guide rail 10. The engaging projection 43 is configured of a columnar portion 43a, having the shape of a rectangle in a plan view, which is press-fitted lightly into and surrounded by the box section of the guide rail 10, which is configured of the pair of facing walls 11 and the connecting wall 12. A protrusion 43c1 which is fitted into the slit 12a with minimum clearance is formed on the side of the columnar portion 43a which faces the connecting wall 12, and the protrusion 43c1 is provided at the end thereof with a retaining wall portion 43c3 which extends alongside an outer surface of the connecting wall 12 of the guide rail 10; the protrusion 43c1 and the retaining wall portion 43c3 form the shape of a hook.

In FIG. 8(D), the guide rail 10 is a uniform cross-sectional member which is configured of a cross-sectional U-shaped box section (engaging portion) provided with a pair of facing walls 11, and a connecting wall 12 which connects one end of each of the pair of facing walls 11. The pair of facing walls 11 and the connecting wall 12 are provided with slits (engaging portions) 11a and a slit (engaging portion) 12a, respectively, the ends of which are open toward the drum housing 40. Both the slits 11a and the slit 12a extend in a direction parallel to the lengthwise direction of the guide rail 10.

The drum housing 40 is provided, at the end thereof on the guide rail 10 side, with an engaging projection 43 which projects toward the guide rail 10. The engaging projection 43 is provided with a columnar portion 43a, having the shape of a rectangle in a plan view, which is press-fitted lightly into and surrounded by the box section of the guide rail 10, which is configured of the pair of facing walls 11 and the connecting wall 12. Protrusions 43b which are fitted into the slits 11a with minimum clearance are formed on the two sides of the columnar portion 43a which face the pair of facing walls 11. A protrusion 43c1 which is fitted into the slit 12a with minimum clearance is formed on the side of the columnar portion 43a which faces the connecting wall 12.

In FIG. 8(E), the guide rail 10 is a uniform cross-sectional member which is composed of a cross-sectional U-shaped box section (engaging portion) provided with a pair of facing walls 11 and a connecting wall 12 which connects one end of each of the pair of facing walls 11. The pair of facing walls 11 and the connecting wall 12 are provided with slits (engaging portions) 11a and a slit (engaging portion) 12a, respectively, the ends of which are open toward the drum housing 40. Both the slits 11a and the slit 12a extend in a direction parallel to the lengthwise direction of the guide rail 10.

The drum housing 40 is provided, at the end thereof on the guide rail 10 side, with an engaging projection 44 which projects toward the guide rail 10. The engaging projection 44 is in the shape of a substantially letter T in cross section, including a laterally-elongated shaft portion 44a, both ends of which are fitted into the slits 11a of the pair of facing walls 11 with minimum clearance, and a vertically-elongated shaft portion 44b which is elongated downward from a central portion of the laterally-elongated shaft portion 44a to be fitted into the slit 12a with minimum clearance.

In FIG. 8(F), the guide rail 10 is a uniform cross-sectional member which is configured of a cross-sectional U-shaped box section (engaging portion) provided with a pair of facing walls 11 and a connecting wall 12 which connects one end of each of the pair of facing walls 11. The pair of facing walls 11 are provided with slits (engaging portions) 11a, the ends of which are open toward the drum housing 40. The slits 11a extend in a direction parallel to the lengthwise direction of the guide rail 10.

The drum housing 40 is provided, at the end thereof on the guide rail 10 side, with an engaging projection 45 which projects toward the guide rail 10. The engaging projection 45 is in the shape of a substantially letter H in cross section, including a laterally-elongated shaft portion 45a, both ends of which are fitted into the slits 11a of the pair of facing walls 11 with minimum clearance, and retaining wall portions 45b which are formed at both ends of the laterally-elongated shaft portion 45a to extend along outer surfaces of the pair of facing walls 11.

In FIG. 8(G), the guide rail 10 is a uniform cross-sectional member which is configured of a cross-sectional U-shaped box section (engaging portion) provided with a pair of facing walls 11 and a connecting wall 12 which connects one end of each of the pair of facing walls 11. The connecting wall 12 is provided with a slit (engaging portion) 12a, the end of which is open toward the drum housing 40. The slit 12a extends in a direction parallel to the lengthwise direction of the guide rail 10.

The drum housing 40 is provided, at the end thereof on the guide rail 10 side, with an engaging projection 46 which projects toward the guide rail 10. The engaging projection 46 is in the shape of a substantially letter I in cross section, including a vertically-elongated shaft portion 46a which is fitted into the slit 12a of the connecting wall 12 with minimum clearance and retaining wall portions 46b which are formed at both ends of the vertically-elongated shaft portion 46a to extend along inner and outer surfaces of the connecting wall 12.

In the other embodiments (modified examples) shown in FIGS. 8(A), 8(D), 8(E) and 8(F), the drum housing 40 can be molded using, e.g., a split mold including a fixed mold and a movable mold which move toward and away from each other in a direction orthogonal to the projecting direction of the engaging projection 43, 44 or 45 and in a direction in which the wind-up drum 60 is housed in the circular hole (housing portion) 41. Such a split mold is low-priced compared with a slide type, thus being advantageous in molding cost for the drum housing 40.

Figure 9A:
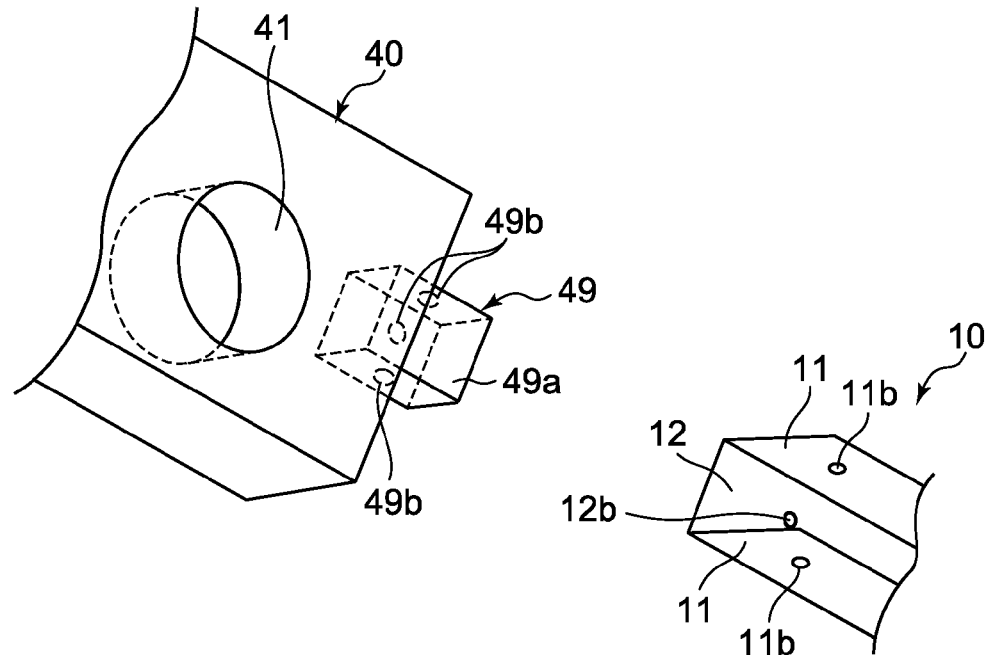
FIGS. 9A and 9B show second drawings of the other embodiments (modified embodiments) of the engaging projection that is formed on the drum housing and the engaging portion that is formed on the guide rail.
Figure 9B:
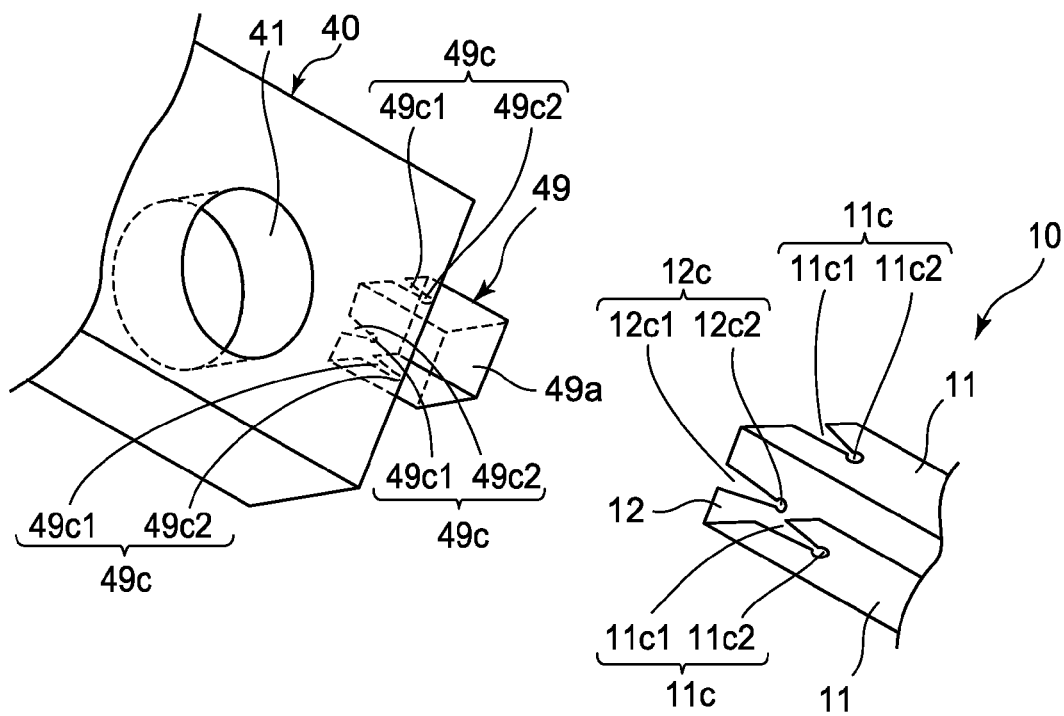

FIGS. 9(A) and 9(B) show further embodiments of the windowpane raising and lowering mechanism 1 according to the present invention.

In FIG. 9(A), the guide rail 10 is a uniform cross-sectional member which is configured of a substantially cross-sectional U-shaped box section (engaging portion) provided with a pair of facing walls 11 and a connecting wall 12 which connects one ends of the pair of facing walls 11. A circular hole (engaging portion) 11b is formed through each of the pair of facing walls 11 and a circular hole (engaging portion) 12b is formed through the connecting wall 12.

The drum housing 40 is provided, at the end thereof on the guide rail 10 side, with an engaging projection 49 which projects toward the guide rail 10. The engaging projection 49 is provided with a columnar portion 49a, having the shape of a rectangle in a plan view, which is press-fitted lightly into and surrounded by the box section of the guide rail 10, which is configured of the pair of facing walls 11 and the connecting wall 12. Circular projections 49b which are fitted into the circular holes 11b and 12b are formed on the three sides of the columnar portion 49a which face the pair of facing walls 11 and the connecting wall 12, respectively.

In FIG. 9(B), the guide rail 10 is a uniform cross-sectional member which is configured of a substantially cross-sectional U-shaped box section (engaging portion) provided with a pair of facing walls 11 and a connecting wall 12 which connects one ends of the pair of facing walls 11. The pair of facing walls 11 and the connecting wall 12 are provided with slits (engaging portions) 11c and a slit (engaging portion) 12c, respectively, the ends of which are open toward the drum housing 40. Each slit 11c is provided with a V-shaped slit portion 11c1, the width of which narrows in a direction away from the end of the V-shaped slit portion 11c1 on the drum housing 40 side, and a circular slit portion 11c2 which is formed at the tip of the V-shaped slit portion 11c1. The slit 12c is provided with a V-shaped slit portion 12c1, the width of which narrows in a direction away from the end of the V-shaped slit portion 12c1 on the drum housing 40 side, and a circular slit portion 12c2 which is formed at the tip of the V-shaped slit portion 12c1.

The drum housing 40 is provided, at the end thereof on the guide rail 10 side, with an engaging projection 49 which projects toward the guide rail 10. The engaging projection 49 is provided with a columnar portion 49a, having the shape of a rectangle in a plan view, which is press-fitted lightly into and surrounded by the box section of the guide rail 10, which is configured of the pair of facing walls 11 and the connecting wall 12. Engaging projections 49c which are fitted into the slits 11c and 12c are formed on the three sides of the columnar portion 49a which face the pair of facing walls 11 and the connecting wall 12, respectively. Each engaging projection 49c is provided with a V-shaped protrusion 49c1 which corresponds in shape to the associated V-shaped slit 11c1 or 12c1 and a circular protrusion 49c2 which corresponds in shape to the associated circular slit 11c2 or 12c2.

In the above described embodiments, the case where the wire guide pulley 30 is provided at the upper end of the guide rail 10 and the drum housing 40 is provided at the lower end of the guide rail 10 has been illustrated by example. However, it is possible for the vertical positions of the wire guide pulley and the drum housing to be reversed to provide the drum housing and the wire guide pulley at the upper end and the lower end of the guide rail, respectively.

In the above described embodiments, the case where the slits 11a and the slit 12a are formed to extend in a direction parallel to the lengthwise direction of the guide rail 10 has been illustrated by example. However, the shape of each slit is not limited thereto; for instance, each slit can be formed to extend obliquely with respect to the lengthwise direction of the guide rail; i.e., the shape of each slit is optional.

In the above described embodiments, the case where the wind-up drum 60 is housed in the circular hole 41 that is formed in the drum housing 40 at a center thereof has been illustrated by example. However, the position where the wind-up drum is housed is not limited thereto; for instance, it is possible for a circular hole to be formed in the drum housing at a position deviating from the center of the drum housing and for the wind-up drum to be housed in this circular hole.

In the above described embodiments, the case where the two drive wires 70 and 71 are used has been illustrated by example. However, it is possible for a drive wire to be wound around the wind-up drum, for one end of the drive wire which extends from the wind-up drum to be fixed to the slider base via the wire guide pulley and for the other end of the drive wire which extends from the wind-up drum to be fixed directly to the slider base.

In the above described embodiments, the case where a motor-driven windowpane raising and lowering mechanism using the motor unit 50 as a drive portion for rotationally driving the wind-up drum has been illustrated by example. However, the present invention can also be applied similarly to a manually-operated windowpane raising and lowering mechanism using a manually-operated handle, as a drive portion for rotationally driving the wind-up drum, which is linked with the wind-up drum.

Although the case where the guide rail 10 is configured of a cross-sectional U-shaped box section (engaging portion), wherein the outward-projecting lugs 13 or the inward-projecting lugs 14 are formed to project from the other ends of the pair of facing walls 11, has been illustrated by example in addition to the case where the guide rail 10 is configured of a cross-sectional U-shaped box section and is provided with the pair of facing walls 11 and the connecting wall 12 which connects one end of each of the pair of facing walls 11, each of the outward-projecting lugs 13 and the inward-projecting lugs 14 can be omitted.

In the above illustrated embodiments, the case where protrusions formed on the drum housing 40 are fitted into slits formed on the guide rail 10 with minimum clearance has been illustrated by example. However, in the case where the retaining wall portion is formed at the end of the protrusion of the drum housing 40, a certain degree of clearance can exist between the slit of the guide rail 10 and the protrusion of the drum housing 40.

INDUSTRIAL APPLICABILITY

The windowpane raising and lowering mechanism according to the present invention is suitably applicable to, e.g., a windowpane raising and lowering mechanism for raising and lowering a windowpane of a motor vehicle.

REFERENCE SIGN LIST

1 Windowpane raising and lowering mechanism
10 Guide rail
11 Facing wall (box section/engaging portion)
11a Slit (engaging portion)
11b Circular hole (engaging portion)
11c Slit (engaging portion)
11c1 V-shaped slit portion
11c2 Circular slit portion
12 Connecting wall (box section/engaging portion)
12a Slit (engaging portion)
12b Circular hole (engaging portion)
12c Slit (engaging portion)
12c1 V-shaped Slit portion
12c2 Circular Slit portion
13 Outward-projecting lug (outward flange portion)
14 Inward-projecting lug (inward flange portion)
20 Slider base
30 Wire guide pulley (wire guide member)
31 Rotational shaft hole
32 Rotational shaft
40 Drum housing
41 Circular hole (housing portion)
42 Wire guide groove
43 Engaging projection
43a Columnar portion (engaging projection)
43b Protrusion (engaging projection)
43c1 Protrusion (engaging projection)
43c2 Retaining wall portion
43c3 Retaining wall portion
44 Engaging projection
44a Laterally-elongated shaft portion
44b Vertically-elongated shaft portion
45 Engaging projection
45a Laterally-elongated shaft portion
45b Retaining wall portion
46 Engaging projection
46a Vertically-elongated shaft portion
46b Retaining wall portion
49 engaging projection
49a Columnar portion
49b Circular projection
49c Engaging projection
49c1 V-shaped protrusion
49c2 Circular protrusion
50 Motor unit (drive portion)
51 Worm wheel
60 Wind-up drum
70 Drive wire
70a Fixing portion 71 Drive wire
71a Fixing portion

The invention claimed is:

1. A windowpane raising and lowering mechanism comprising:
   a guide rail which slidably guides a slider base therealong, a windowpane is fixed to said slider base;
   a wire guide member which is provided at one end of said guide rail;
   a drum housing which is provided at another end of said guide rail and supports a wind-up drum which is driven to rotate by a drive portion; and
   a drive wire which extends from said slider base and is wound around said wire guide member and said wind-up drum,
   wherein an engaging portion is formed on said another end of said guide rail, said engaging portion is arranged to engage with an engaging projection of said drum housing;
   wherein an end surface of said drum housing comprises a contacting surface which contacts an edge of said engaging portion;
   wherein said engaging projection is formed on said end surface and projects through said guide rail; and
   wherein said engaging portion restricts relative movement between said guide rail and said drum housing in a vehicle widthwise direction by engaging a generally planar vertical outer side of said engaging projection of said drum housing.

2. The windowpane raising and lowering mechanism according to claim 1, wherein said engaging projection of said drum housing comprises:
   a columnar portion, and
   a protrusion which protrudes from said columnar portion,
   wherein said engaging portion of said guide rail comprises a channel section including a pair of facing walls and a connecting wall which connects said pair of facing walls; a slit is formed in at least one of said pair of facing walls and said connecting wall, said slit being open at said edge of said engaging portion, and
   wherein said relative movement between said guide rail and said drum housing in said vehicle widthwise direction is restricted by said columnar portion being disposed in said channel section and by said protrusion extending through said slit.

3. The windowpane raising and lowering mechanism according to claim 2, wherein said slit is formed in said connecting wall,
   wherein said protrusion includes a retaining wall portion which extends alongside an outer surface of said connecting wall, and
   wherein said relative movement between said guide rail and said drum housing in said vehicle widthwise direction is restricted by said connecting wall being sandwiched between said columnar portion and said retaining wall portion.

4. The windowpane raising and lowering mechanism according to claim 2, wherein said slit is formed in at least one of said pair of facing walls, and
   wherein said relative movement between said guide rail and said drum housing in said vehicle widthwise direction is restricted by said protrusion extending through said slit.

5. The windowpane raising and lowering mechanism according to claim 2, wherein said slit is formed in at least one of said pair of facing walls and a second slit is formed in the other one of said pair of facing walls,
   wherein said protrusion comprises two protrusions each including a retaining wall portion formed on an end thereof, each of said protrusions is fitted into a respective one of said slits, and
   wherein relative movement between said guide rail and said drum housing in a vehicle forward and rearward direction is restricted by each said facing walls being sandwiched between said columnar portion and a respective one of said retaining wall portions.

6. The windowpane raising and lowering mechanism according to claim 2, wherein said slit is formed in said connecting wall, and
   wherein relative movement between said guide rail and said drum housing in a vehicle forward and rearward direction is restricted by said protrusion extending through said slit of said connecting wall.

7. The windowpane raising and lowering mechanism according to claim 1, wherein said drum housing is made of synthetic resin and comprises a housing portion which houses said wind-up drum, and
   wherein said drum housing is molded using a split mold including a fixed mold and a movable mold which move toward and away from each other.

* * * * *